United States Patent [19]
Schneider et al.

[11] 3,808,448
[45] Apr. 30, 1974

[54] FOG REAR LIGHT FOR MOTOR VEHICLES

[75] Inventors: Hartmut Schneider, Schmiden; Gerhard Drücker, Stuttgart; Reinhard Filsinger, Waiblingen, all of Germany

[73] Assignee: Daimler-Benz Aktiengesellschaft, Stuttgart-Unterturkheim, Germany

[22] Filed: May 24, 1971

[21] Appl. No.: 146,075

[30] Foreign Application Priority Data
May 23, 1970  Germany............................ 2025303

[52] U.S. Cl. .............................. 307/10 LS, 315/82
[51] Int. Cl. .............................................. B60g 1/02
[58] Field of Search............. 307/10 LS; 315/82, 83

[56] References Cited
UNITED STATES PATENTS
| | | | |
|---|---|---|---|
| 3,381,169 | 4/1968 | Brock et al. | 315/83 |
| 3,146,374 | 8/1964 | Kikuyama | 315/83 |
| 3,273,012 | 9/1966 | Rosenblum | 315/82 |

*Primary Examiner*—Herman Hohauser
*Attorney, Agent, or Firm*—Craig and Antonelli

[57] ABSTRACT

A fog tail light, especially for motor vehicles in which means are provided for automatically turning off the fog tail light when the headlights of a following vehicle fall on the same and which again turn on the fog tail light after the disappearance of the headlights.

2 Claims, 1 Drawing Figure

PATENTED APR 30 1974  3,808,448
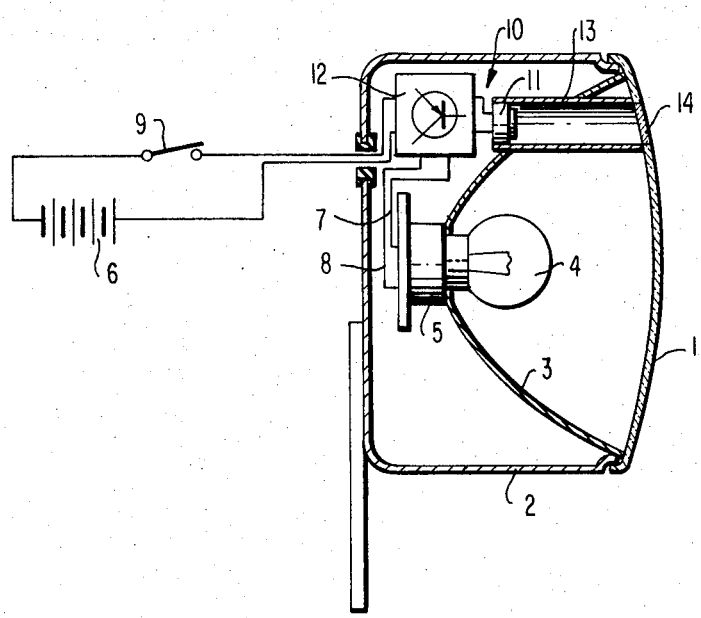
INVENTORS
HARTMUT SCHNEIDER
GERHARD DRÜCKER
REINHARD FILSINGER
BY Craig, Antonelli & Hill
ATTORNEYS

FOG REAR LIGHT FOR MOTOR VEHICLES

The present invention relates to a fog tail light, and more particularly to a fog tail light for motor vehicles.

Fog tail lights at motor vehicles which are turned on, are intended to give notice to the drivers of following motor vehicles that in front of same an obstacle in the form of a motor vehicle is present on the road. In order to be able to penetrate also through dense fog, the fog tail lights must have a relatively high light intensity. This, however, entails the disadvantage that the passengers of closely following and/or of passing vehicles are blinded, especially when the fog is less dense and the fog tail lights are used in fog-free areas.

The present invention is concerned with the task to avoid the described disadvantages with the use of fog tail lights. The underlying problems are solved according to the present invention in that means are provided in or at the fog tail light which automatically turn off the fog tail light, when the light of headlights falls upon the same and which again turn on the fog tail light after the disappearance of the effect of the light from the headlights.

The measures according to the invention contribute in an advantageous manner to the safety in the road traffic because it remains impossible that a driver who, when his vehicle drives behind a vehicle equipped with a turned-on fog tail light or who passes this vehicle, is blinded by the high light intensity of the fog tail light.

In one embodiment of the present invention, the means for turning on and off may consist of a light-sensitive electronic structural element which acts on a switching transistor by way of a trigger circuit. Particularly advantageously, the light-sensitive electronic element may be arranged at the end of a tubular member because it is possible thereby to undertake the turning off of the fog tail light only when the following vehicle has reached a certain minimum distance. Additionally, it is prevented thereby that other light sources, for example, the street lighting, can have any influence on the fog tail lights.

Insofar as the means for the automatic turning off and for the automatic turning on again are arranged in the housing of the fog tail light, the tubular member with the light-sensitive electronic element may be closed off by a glass pane which is a component of the glass pane covering the housing of the fog tail light.

Furthermore, the construction of the fog tail light may be made in such a manner that an automatic re-energization of the fog tail light is delayed. It is made impossible thereby that the fog tail light blinks if, for example, several vehicles disposed relatively close one behind the other, pass the vehicle equipped with the fog tail light.

Accordingly, it is an object of the present invention to provide a fog tail light, especially for motor vehicles, which avoids by simple means the aforementioned shortcomings and drawbacks encountered heretofore.

Another object of the present invention resides in a fog tail light for motor vehicles which effectively prevents blinding of drivers and/or passengers in vehicles closely following the vehicle equipped with the tail light and/or passing same.

A further object of the present invention resides in a control arrangement for a fog tail light which greatly contributes to the safety in the road traffic.

Still a further object of the present invention resides in a fog tail light for motor vehicles which precludes the influence of street lighting on the operation of the control circuit for the fog light.

These and further objects, features and advantages of the present invention will become more obvious from the following description when taken in connection with the accompanying drawing, which shows, for purposes of illustration only, one embodiment in accordance with the present invention, and wherein:

The single FIGURE is a schematic cross-sectional view through a fog tail light in accordance with the present invention.

Referring now to the single FIGURE of the drawing, a reflector 3 for the light radiated by the incandescent lamp 4 or the like is arranged on the inside of the housing 2 closed off by a window pane 1. A lamp socket 5 is mounted centrally in the reflector 3 whose contact springs (not shown) are connected with the cables 7, 8 leading to a voltage source 6.

In order to ensure that no blinding danger can occur when the fog tail light is turned on, i.e., when the switch 9 in the circuit is closed and the incandescent lamp 4 lights up, the control installation generally designated by reference numeral 10 is provided in the fog tail light.

The control device 10 consists of a light-sensitive electronic element 11 and of a trigger circuit 12, which may be formed by a Schmitt trigger circuit, combined with a switching transistor of any conventional construction. The light-sensitive electronic element 11 is mounted at the end of a horizontally disposed tubular element 13 which begins closely behind the glass pane 1. The usually red-colored glass pane 1 may include a colorless transparent area 14 within the circumference of the tubular member 13.

As soon as light originating from headlights at a predetermined distance falls on the engaged or turned-on fog tail light, this light enters through the transparent area 14 within the glass 1 into the tubular member 13 and affects the light-sensitive electronic element 11 which, by way of the trigger circuit 12 and the switching transistor (not shown) interrupts the energizing circuit and after disappearance of the headlights again reestablishes the energizing circuit preferably with a delay. The delay may be achieved by conventional means, known as such in the art and therefore not illustrated in detail herein.

The light-sensitive electronic element 11 may, together with the trigger circuit 12 and the switching transistor be combined appropriately into an integrated circuit.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A fog tail light, especially for motor vehicles, comprising a housing, a single incandescent lamp mounted in said housing, said single incandescent lamp having a single filament, connection means for connection to a source of voltage, and control means connected with said incandescent lamp to said connection means for completely extinguishing the single filament of said incandescent lamp automatically upon detection of an impinging headlight, including a light-sensitive electronic element connected by way of a trigger circuit with a switching transistor connected between said connection means and said incandescent lamp and means for delaying automatic re-energization of said incandescent lamp subsequent to extinction thereof by said light sensitive electronic element.

2. A fog tail light as defined in claim 1 wherein said trigger circuit is a Schmitt trigger circuit.

* * * * *